US008675792B2

(12) United States Patent
Carbonelli et al.

(10) Patent No.: US 8,675,792 B2
(45) Date of Patent: Mar. 18, 2014

(54) METHOD OF DOPPLER SPREAD ESTIMATION

(75) Inventors: Cecilia Carbonelli, Munich (DE); Michael Horvat, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 105 days.

(21) Appl. No.: 13/226,580

(22) Filed: Sep. 7, 2011

(65) Prior Publication Data

US 2013/0058443 A1 Mar. 7, 2013

(51) Int. Cl.
*H03D 1/04* (2006.01)

(52) U.S. Cl.
USPC ........... 375/346; 375/316; 375/340; 375/343; 375/347; 375/350

(58) Field of Classification Search
USPC ......... 375/150, 302, 316, 322, 329, 340, 343, 375/346, 347, 348
See application file for complete search history.

(56) References Cited

U.S. PATENT DOCUMENTS

| | | | | |
|---|---|---|---|---|
| 5,652,772 | A | 7/1997 | Isaksson et al. | |
| 6,680,969 | B1 * | 1/2004 | Molnar et al. | 375/224 |
| 8,355,473 | B2 * | 1/2013 | Li et al. | 375/346 |
| 2002/0172307 | A1 * | 11/2002 | Sandberg | 375/344 |
| 2007/0076804 | A1 * | 4/2007 | Sestok et al. | 375/260 |
| 2007/0242760 | A1 * | 10/2007 | Hsiung et al. | 375/260 |
| 2010/0040154 | A1 | 2/2010 | Carbonelli et al. | |
| 2010/0290570 | A1 * | 11/2010 | Sathananthan et al. | 375/346 |
| 2011/0019749 | A1 * | 1/2011 | Wilhelmsson et al. | 375/259 |
| 2011/0098073 | A1 * | 4/2011 | Park et al. | 455/509 |
| 2011/0200073 | A1 * | 8/2011 | Zalio | 375/130 |
| 2012/0027110 | A1 * | 2/2012 | Han et al. | 375/260 |
| 2012/0082274 | A1 * | 4/2012 | Bury | 375/346 |
| 2012/0320961 | A1 * | 12/2012 | Pham et al. | 375/227 |

FOREIGN PATENT DOCUMENTS

WO WO 2010117236 A2 * 10/2010

OTHER PUBLICATIONS

3GPP TS 36.211 V8.9.0 (Dec. 2009). pp. 62-65.
3GPP TS 36.211 V9.1.0 (Mar. 2010). pp. 65-74.
Morelli, M; Mengali U., A comparison of pilot-aided channel estimation methods for OFDM systems., IEEE Transactions on Signal Processing, vol. 49, Issue 12, Dec. 2001, pp. 3065-3073.
Hoeher P., Kaiser S., Robertson P., Pilot-Symbol-Aided Channel Estimation in Time and Frequency (1997), In Proc. International Conference on Acoustics, Speech and Signal Proc. (ICASSP'97), vol. 3, pp. 1845-1848, Munich, Apr. 1997.
C. Tepedelenlioglu, A. Abdi, G. G. Giannakis, M. Kaveh, "Estimation of Doppler spread and signalstrength in mobile communications with applications to handoff and adaptive transmission", Wireless Communications and Mobile Computing, 2001; 1:221-242.

(Continued)

*Primary Examiner* — Hirdepal Singh
(74) *Attorney, Agent, or Firm* — Eschweiler & Associates, LLC

(57) ABSTRACT

A method includes receiving a signal comprising a symbol-carrier matrix, the symbol-carrier matrix including a predetermined pattern of reference symbols, and determining at least one channel estimate $\hat{H}_{i,k}$ at at least one of the reference symbol positions of the reference symbols in the symbol-carrier matrix, wherein i=0,1,2, . . . is the carrier index and k=0,1,2, . . . is the symbol index of the symbol-carrier matrix. The method further includes determining a Doppler spread $\hat{\omega}_D$ on the basis of the at least one channel estimate $\hat{H}_{i,k}$.

17 Claims, 9 Drawing Sheets

(56) References Cited

OTHER PUBLICATIONS

T. Yücek, R. M. A. Tannies, H. Arslan, “Doppler spread estimation for wireless OFDM systems”, in Proceedings, 2005 IEEE Sarnoff Symposium, Apr. 2005.

3GPP TS 36.133 V9.6.0 (Dec. 2010). pp. 75-78.

3GPP TS 36.355 V9.4.0 (Dec. 2010). pp. 38-41.

3GPP TS 36.214 V9.2.0 (Jun. 2010). pp. 1-14.

Speth, M.; Fechtel, S. ; Fock, G.; Meyr, H., “Optimum receiver design for wireless broad-band systems using OFDM.I”, IEEE Transactions on Communications, vol. 47, Issue 11, Nov. 1999, pp. 1668-1677.

3GPP TS 36.211 V1.3.2 (Sep. 2007): 3rd Generation Partnership Project; Technical Specification Group Radio Access Network; Evolved Universal Terrestrial Radio Access (E-UTRA); Physical Channels and Modulation. pp. 16-22.

J. Cai, W. Song, Z. Li, “Doppler estimation for mobile OFDM systems”, IEEE Transactions on Consumer Electronics, vol. 49, pp. 973-977, Nov. 2003.

3GPP TS 36.211. V 10.4.0. Dec. 2011. pp. 66-76.

3GPP TS 36.133. V 10.6.0. Mar. 2012. pp. 61-80.

3GPP TS 36.355. V 10.4.0. Dec. 2011. pp. 39-49.

3GPP TS 36.214. V 10.1.0. Mar. 2011. pp. 10-11.

Medbo, J. et al., “Propagation Channel Impact on LTE Positioning Accuracy—A Study Based on Real Measurements of Observed Time Difference of Arrival”, in Proc. PIMRC 2009, pp. 2213-2217, Sep. 2009. 5 Pages.

Zhao, M. et al., “Iterative Turbo Channel Estimation for OFDM System over Rapid Dispersive Fading Channel”, IEEE Transactions on Wireless Communications, vol. 7, No. 8, pp. 3174-3184, Aug. 2008. 11 Pages.

Shin, C. et al., “Blind Channel Estimation for MIMO-OFDM Systems”, IEEE Transactions on Vehicular Technology, vol. 56, No. 2, pp. 670-685, Mar. 2007. 16 Pages.

U.S. Appl. No. 13/524,143, filed Jun. 15, 2012. 36 Pages.

* cited by examiner

METHOD OF DOPPLER SPREAD ESTIMATION

FIELD

The present invention relates to a method of Doppler spread estimation in a multiple carrier mobile communication system, a method of channel estimation in a multiple carrier mobile communication system, a Doppler spread estimator for a multiple carrier mobile communication system, and a channel estimator for a multiple carrier mobile communication system.

BACKGROUND

Multiple carrier mobile communication systems are configured on the basis of transmitters and receivers capable of transmitting and receiving multiple carrier data signals. One example of a multiple carrier radio transmission system is Orthogonal Frequency Division Multiplexing (OFDM) in which an OFDM transmitter broadcasts information consisting of symbols containing a plurality of equally spaced carrier frequencies. The characteristics of the wireless communication channel typically vary over time due to changes in the transmission path. For demodulating OFDM modulated data in the presence of substantial time variations of the transmission channel, knowledge of the transmission channel frequency response is required. This necessitates that the receiver provides an appropriate channel estimate of the transmission channel.

A transmission channel is known to be characterized among a number of parameters by a quantity known as the Doppler spread of the channel. When a user or reflector in its environment is moving, the user's velocity causes a shift in the frequency of the signal transmitted along each signal path. This phenomenon is known as the Doppler shift. Signals travelling along different paths can have different Doppler shifts, corresponding to different rates of change in phase. The difference in Doppler shifts between different signal components contributing to a single fading channel tap is known as the Doppler spread. Doppler spread estimation is crucial to channel estimation and to any other block in the system which requires an indication of the speed of the mobile, e.g. whether it is static or not, to perform some specific signal processing.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

DETAILED DESCRIPTION

Figure 1:
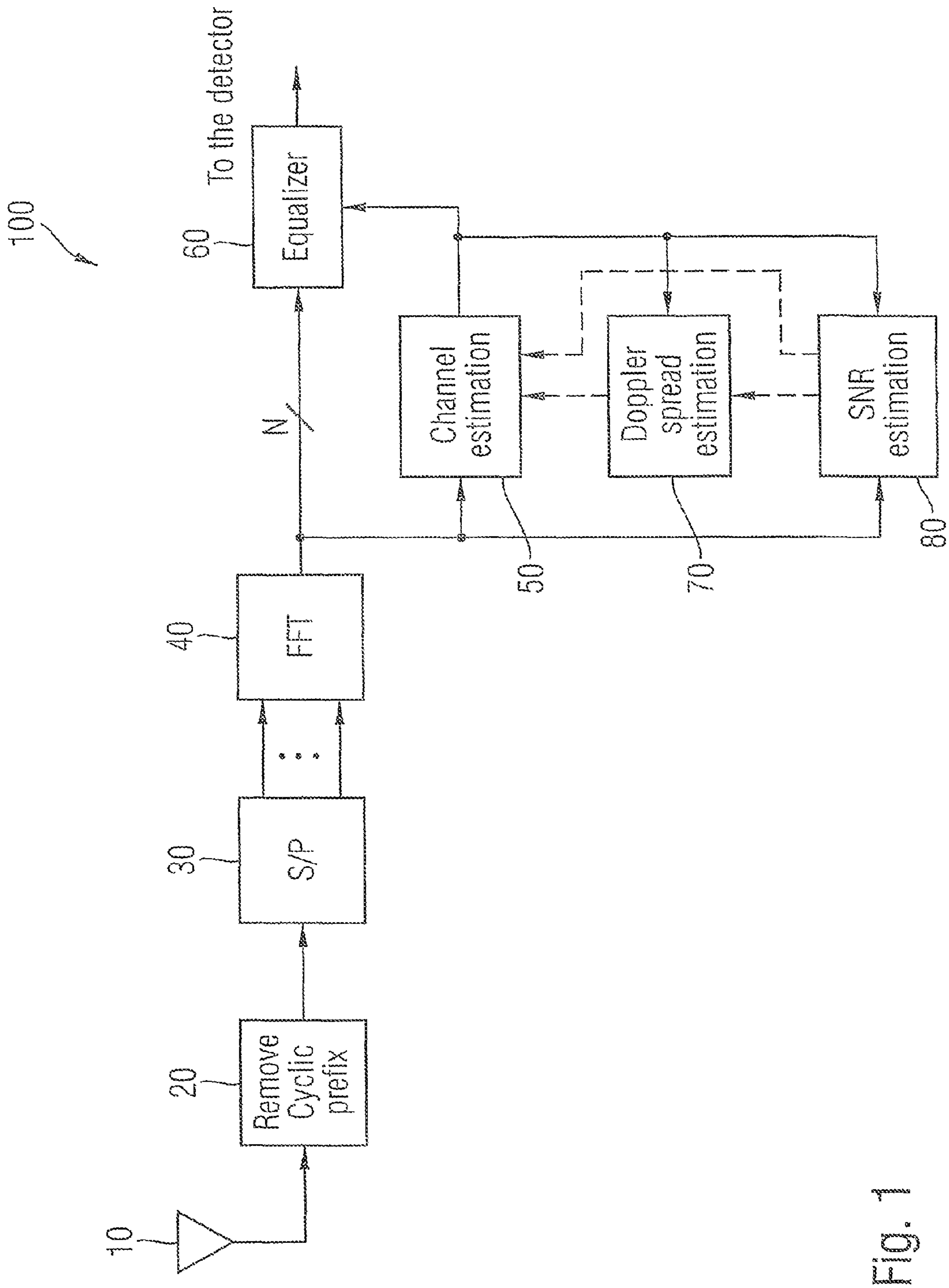
FIG. 1 shows a schematic block representation of a receiver for a multiple carrier mobile communication system.

The aspects and embodiments are described with reference to the drawings, wherein like reference numerals are generally utilized to refer to like elements throughout. In the following description, for purposes of explanation, numerous specific details are set forth in order to provide a thorough understanding of one or more aspects of the embodiments. It may be evident, however, to one skilled in the art that one or more aspects of the embodiments may be practiced with a lesser degree of the specific details. In other instances, known structures and elements are shown in schematic form in order to facilitate describing one or more aspects of the embodiments. It is to be understood that other embodiments may be utilized and structural or logical changes may be made without departing from the scope of the present invention.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether or not they are in direct physical or electrical contact. Also, the term "exemplary" is merely meant as an example, rather than the best or optimal. The following detailed description, therefore, is not to be taken in a limiting sense, and the scope of the present invention is defined by the appended claims.

The apparatuses and methods as described herein are utilized as part of and for multiple carrier radio transmission systems, in particular for systems operating in the Orthogonal Frequency Division Multiplex (OFDM) mode. The apparatuses disclosed may be embodied in baseband segments of devices used for the reception of OFDM radio signals, in particular receivers like mobile phones, hand-held devices or other kinds of mobile radio receivers. The described apparatuses may be employed to perform methods as disclosed herein, although those methods may be performed in any other way as well.

The following description may be read in connection with any kind of multiple carrier radio transmission systems, in particular any mobile communications systems employing multiple carrier modulation, such as, for example, the Universal Mobile Telecommunications System (UMTS) Standard or the Long Term Evolution (LTE) Standard.

The following description may also be read in connection with multiple carrier radio transmission systems in the field of digital video broadcasting (DVB-T/H) which is based on terrestrial transmitters and a communication system design adapted for mobile or hand-held receivers. However, also other communications systems, for example, satellite OFDM systems, may benefit from the concepts and principles outlined herein.

The methods and apparatuses as described herein may be utilized with any sort of antenna configurations employed within the multiple carrier radio transmission system as described herein. In particular, the concepts presented herein are applicable to radio systems employing an arbitrary number of transmit and/or receive antennas, that is Single Input Single Output (SISO) systems, Single Input Multiple Output (SIMO) systems, Multiple Input Single Output (MISO) systems and Multiple Input Multiple Output (MIMO) systems.

Referring to FIG. 1, there is shown a schematic block representation of a receiver according to an embodiment which may demodulate and decode OFDM multi-carrier transmission signals. The receiver 100 may include a baseband processor for carrying out the different functions as shown in FIG. 1. The baseband processor receives OFDM signals by an antenna 10, removes the cyclic prefix (CP) in a functional block 20, performs a serial/parallel conversion in a functional block 30, transforms the signal into the frequency domain using a fast Fourier transform (FFT) in a functional block 40, performs channel estimation in a functional block 50, and equalization in functional block 60. Assuming perfect synchronization, the complex baseband representation of the received signal $y_{k,l}$ for sub-carrier k and OFDM symbol l reduces to:

$$y_{k,l}=x_{k,l}H_{k,l}+z_{k,l},\ k=1, \ldots, N\ l=1, \ldots, L \quad (1)$$

where $x_{k,l}$, $H_{k,l}$ and $z_{k,l}$ denote the transmitted symbol with energy per symbol $E_s$, the channel transfer function sample and the additive white Gaussian noise with zero mean and variance $N_0$, respectively.

An output of the channel estimation block 50 is connected to an input of a Doppler spread estimation block 70 wherein the Doppler spread can be estimated on the basis of the channel estimates, e.g. at reference symbol positions such as cell-specific reference (pilot) signals or positioning reference signals, determined in the channel estimation block 50. Possible ways of transmitting such reference symbols will be explained in connection with FIGS. 2a-2c.

An output of the Doppler spread estimation block 70 is connected to an input of the channel estimation block 50 for supplying a Doppler spread estimated in the Doppler spread estimation block 70 to the channel estimation block 50. An output of the fast Fourier transformation block 40 is not only connected to an input of the channel estimation block 50 but also to an input of an SNR estimation block 80 wherein a signal-to-noise ratio of the received and Fourier transformed signal is estimated. An output of the channel estimation block 50 is also connected with another input of the SNR estimation block 80. An output of the SNR estimation block 80 is connected with an input of the Doppler spread estimation block 70 and another output of the SNR estimation block 80 is connected with an input of the channel estimation block 50. The receiver 100 as described before can be used to carry out the methods as set out further below and to incorporate a Doppler spread estimator and a channel estimator such as those set out further below.

Figure 2A:
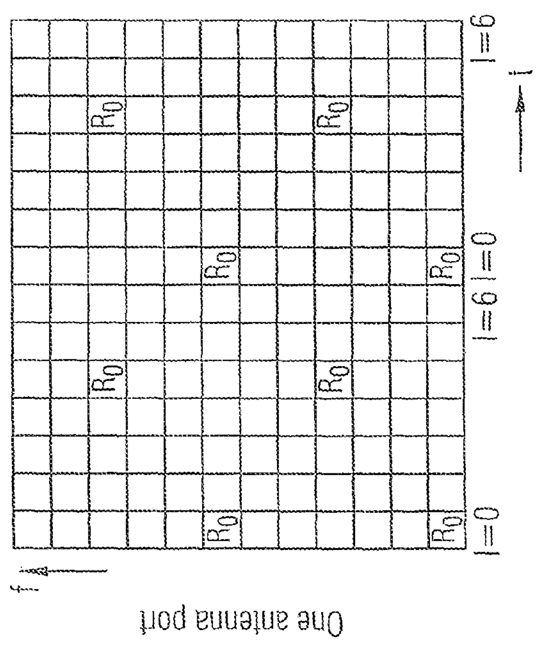
FIGS. 2*a*-2*c* show symbol-carrier matrices containing cell-specific reference signals in a one transmission antenna port configuration (FIG. 2*a*) and in a two transmission antenna port configuration (FIG. 2*b*) and a symbol carrier matrix containing positioning down-link reference signals (FIG. 2*c*), respectively.
Figure 2B:
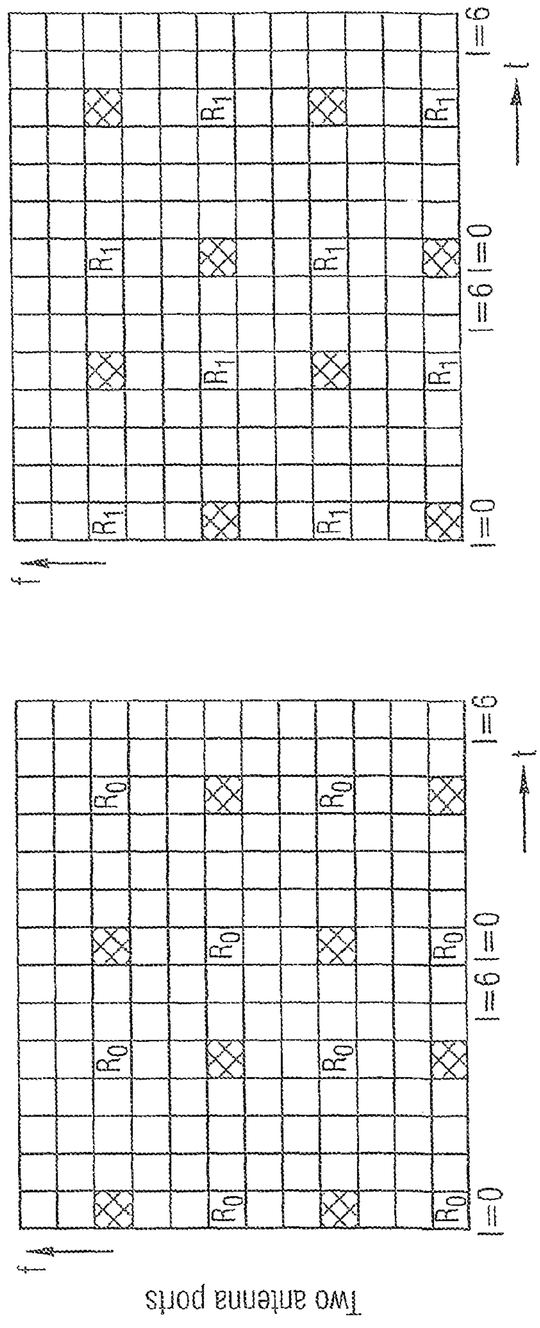
Figure 2C:
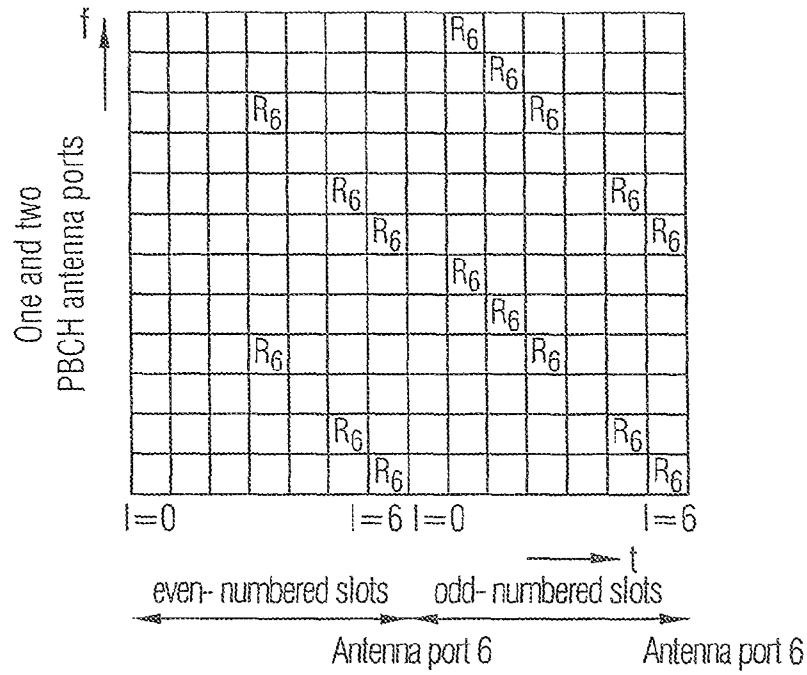

Referring to FIGS. 2a-2c, there are shown symbol-carrier matrices, each containing specific reference symbols at predetermined positions of the symbol-carrier matrix, respectively. FIGS. 2a and 2b show the transmission of cell-specific reference symbols (CSRS) or so-called pilots in a one transmission antenna configuration (FIG. 2a) and a two transmission antenna configuration (FIG. 2b). FIG. 2c shows the transmission of positioning reference symbols (PRS).

In many OFDM systems, in order to facilitate channel estimation, known symbols, namely the above-mentioned CSRS symbols or pilots, are inserted at specific locations in the time-frequency grid or symbol-carrier matrix. The two-dimensional pilot pattern for the LTE case is shown in FIGS. 2a and 2b. It is seen that the pilot spacing in the frequency direction equals six OFDM symbols, while in the time direction there are two OFDM symbols per slot (referred to as reference symbols) containing pilots, at a distance of 4 and 3 OFDM symbols from one another. Channel estimates are first obtained at the pilot positions using simple least squares (LS) demodulation, which for PSK pilot modulation reduces to $$\hat{H}_{n,l}=y_{n,l}x^*_{n,l},\ \{n,l\}\in P \quad (2)$$

where P is the set of all pilot locations. The remaining channel coefficients are then calculated using interpolation techniques in both time and frequency directions.

In LTE, in addition to cell specific reference signals (CSRS), a further reference signal type, namely positioning reference signals (PRS), is introduced, which enables the user equipment (UE) to measure the reference signal time difference (RSTD) between different cells. PRS as well as CSRS are cell-specific and only require the Cell-ID for detection. The corresponding time-frequency grid is shown in FIG. 2c. The UE uses the PRS to measure the RSTD between the subframes from different base station (eNB, evolved node B), which is defined as: $T_{SubframeRxj}-T_{SubframeRxi}$. The RSTD of at least 2 eNB pairs are required by the serving eNB to resolve the position of the reporting UE. The details of the positioning method are of no relevance here and will not be discussed in more detail. In the following it will be shown that PRS symbols as well as CSRS symbols can be utilized for Doppler spread estimation.

Figure 3:
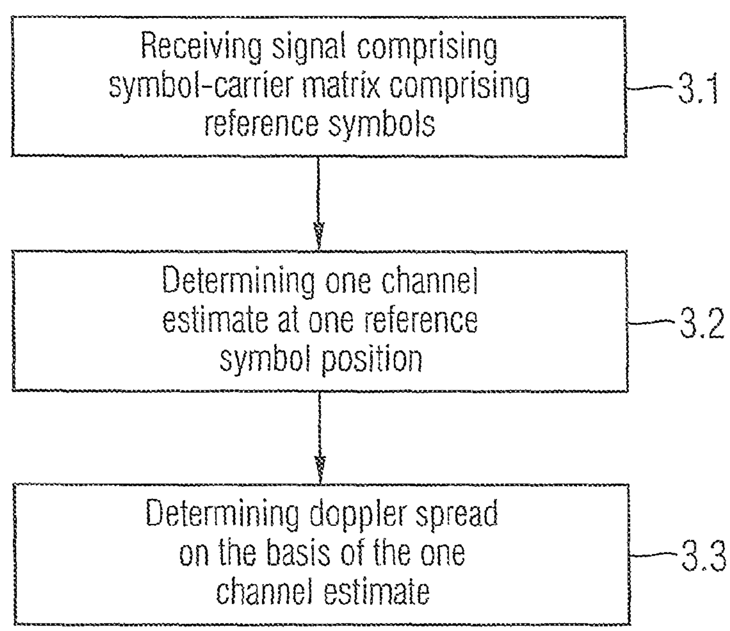
FIG. 3 shows a flow diagram of a method of Doppler spread estimation in a multiple carrier mobile communication system according to an embodiment.

Referring to FIG. 3, there is shown a flow diagram for illustrating a method of Doppler spread estimation in a multiple carrier mobile communication system according to an embodiment. The method comprises receiving a signal comprising a symbol-carrier matrix, the symbol-carrier matrix comprising a predetermined pattern of reference symbols at 3.1, and determining at least one channel estimate $\hat{H}_{i,k}$ at at least one of the reference symbol positions of the reference symbols in the symbol-carrier matrix, wherein i=0,1,2, . . . is the carrier index and k=0,1,2, . . . is the symbol index of the symbol-carrier matrix at 3.2. The method further comprises determining a Doppler spread $\hat{\omega}_D$ on the basis of the at least one channel estimate $\hat{H}_{i,k}$ at 3.3.

According to an embodiment of the method of FIG. 3, determining the at least one channel estimate at the at least one of the reference symbol positions of the reference symbols in the symbol-carrier matrix is performed by least squares demodulation. If the modulation type at the reference symbol positions is phase-shift keying (PSK), the least square demodulation reduces to the above equation (2).

According to an embodiment of the method of FIG. 3, the reference symbols comprise positioning reference symbols such as those depicted in FIG. 2*c* inserted at specific locations in the symbol-carrier matrix as it may be prescribed in one of the mobile communication standards like the LTE standard.

According to an embodiment of the method of FIG. 3, the reference symbols comprise cell-specific reference symbols or so-called pilots such as those depicted in FIGS. 2*a* and 2*b* inserted at specific locations in the symbol-carrier matrix as it may be prescribed in one of the mobile communication standards like the LTE standard.

According to an embodiment of the method of FIG. 3, the method further comprises determining an auto-correlation $\hat{R}(0T_s)=H_{i,k}\times\hat{H}^*_{i,k}$ of the at least one channel estimate $\hat{H}_{i,k}$ or of a channel estimate at a symbol position other than the reference symbol position, or determining at least one further channel estimate $\hat{H}_{i,k+l}$ and determining a correlation $\hat{R}(1T_s)=\hat{H}_{i,k}\times\hat{H}^*_{i,k+l}$, wherein l=1,2, . . . .

In other words, $0T_s$ corresponds to the symbol position of the determined channel estimate at symbol index k and $1T_s$, for example, is a symbol position in a timely distance of one symbol period $T_s$ from the symbol position of the determined channel estimate, and $1T_s$ is a symbol position in a timely distance of I symbol periods $T_s$ from the symbol position of the determined channel estimate.

According to a further embodiment thereof, in case that there is provided a plurality of channel estimates at reference symbol positions and at other symbol positions, an average of the one or several auto-correlations and/or the one or several correlations can be determined according to the following formula:

$$\hat{R}(nT_s)=\frac{1}{2N_pK}\sum_{k=0}^{K-1}\sum_{i=1}^{2N_p}\hat{H}_{i,k}\hat{H}^*_{i,k+n}\quad n=0,1,2 \tag{3}$$

where $N_p$ is the number of available reference symbols in the symbol carrier matrix and K is the length of the observation interval. Note that the sum over i goes from 1 to $2N_p$ because both regular and "virtual" reference symbols can be exploited for this method, wherein "virtual" reference symbols are those obtained from regular reference symbols by interpolation.

According to a further embodiment thereof, the at least one further channel estimate is determined by interpolation, e.g. Wiener interpolation. In a cascaded Wiener estimator, often called 2×1 D, estimation is performed first in frequency—and then in time direction, or vice versa, first in time—and then in frequency direction.

Wiener based estimators rely on minimal a priori channel knowledge. Usually, in a robust but sub-optimal approach, uniform Doppler and delay power spectra are assumed, where the limits ($f_{max}$, $\tau_{max}$) are typically fixed to the maximum Doppler bandwidth $B_D=2f_D$ or Doppler spread $\hat{\omega}_D=2\pi f_D$ (where $f_D$ is the maximum channel Doppler frequency) and to the cyclic prefix length $T_{CP}$, respectively. This allows to pre-compute the interpolation coefficients offline as:

Frequency direction:

$$w_f(n)^T=[w_{f,1}(n), \ldots, w_{f,N_f}(n)]=r_f(n)^TR_f^{-1},\ n\in F \tag{4}$$

Time direction:

$$w_t(l)^T=[w_{t,1}(l), \ldots, w_{t,N_t}(l)]=r_t(l)^TR_t^{-1},\ l\in T \tag{5}$$

where the elements of the cross-correlation and auto-correlation matrices in (4)-(5) are given by (uniform and symmetric Doppler and delay power spectra assumed):

$$\begin{aligned}&[r_f(n)]_i=si(2\pi\tau_{max}\Delta F(n-i)),\ i=1,\ldots,N_f\\&[R_f]_{i,j}=si(2\pi\tau_{max}\Delta F(i-j))+\frac{N_0}{E_s}\delta(i-j),\\&i,j=1,\ldots,N_f\end{aligned} \tag{6}$$

$$\begin{aligned}&[r_t(1)]_i=si(2\pi f_{max}T_s(1-i)),\ i=1,\ldots,N_t\\&[R_t]_{i,j}=si(2\pi f_{max}T_s(i-j))+\frac{N_0}{E_s}\delta(i-j),\\&i,j=1,\ldots,N_t\end{aligned} \tag{7}$$

In equations (6)-(7), si is the sinc function, while ΔF and $T_s$ denote the sub-carrier spacing and the symbol duration, respectively. Note that the indices n and I in equations (4)-(7) account for the fact that 1D Wiener filtering amounts to a window sliding operation along the frequency or time axis. Also, F and T denote the sets of frequency and time indices, respectively, at which interpolation is performed.

It is clear from equations (6)-(7) that typical interpolation filters require preliminary knowledge of the Doppler bandwidth and of the channel length (delay spread). Delay spread estimation techniques are known in the prior art in the form of different variations. In this application we focus on the Doppler spread $\hat{\omega}_D$ or Doppler bandwidth $B_D$, which is related to the receiver velocity $v_0$ by the well-known formula $B_D=v_0f_0/v_c$ where $v_c$ is the speed of light and $f_0$ is the carrier frequency. After determining $\hat{\omega}_D$, $f_D$ (wherein $\omega_D=2\pi f_D$) is to be inserted as $f_{max}$ in equation (7).

According to an embodiment of the method of FIG. 3, the method further comprises determining the Doppler spread $\hat{\omega}_D$ by minimizing a function of the type $$\hat{\omega}_D=\underset{\tilde{\omega}_D}{\operatorname{argmin}}\left[J_0(\tilde{\omega}_DnT_s)-\hat{R}(nT_s)\right]^2 \tag{8}$$

wherein $\omega_D=2\pi f_D$ where $f_D$ is the maximum channel Doppler frequency, and $J_0(\hat{\omega}_DnT_s)$ is the zero order Bessel function of the first kind calculated at a timely distance of $nT_s$ from the symbol position of the at least one of the reference symbol positions, and n=0,1,2, . . . . The notation $\tilde{\omega}_D$ means that different values of cop have to be inserted into the function of equation (8) and the notation $\hat{\omega}_D$ stands for the estimated Doppler spread as a result of the minimization procedure.

According to another embodiment of the method of FIG. 3, the method further comprises determining the Doppler spread $\hat{\omega}_D$ by minimizing a function of the type $$F_\Delta(\tilde{\omega}_D)=[(J_0(\tilde{\omega}_D(p+m)T_s)-J_0(\tilde{\omega}_DpT_s))-(\hat{R}((p+m)T_s)-\hat{R}(pT_s))]^2 \tag{9}$$

or of the type $$F_r(\tilde{\omega}_D)=[(J_0(\tilde{\omega}_D(p+m)T_s)/J_0(\tilde{\omega}_DpT_s))-(\hat{R}((p+m)T_s)/\hat{R}(pT_s))]^2 \tag{10}$$

wherein $\omega_D=2\pi f_D$ where $f_D$ is the Doppler bandwidth, p=0, 1,2, . . . , m=1,2, . . . , and $J_0(\hat{\omega}_DpT_s)$ is the zero order Bessel function of the first kind calculated at a timely distance of $pT_s$ from the symbol position of the at least one of the reference symbol positions and $J_0(\hat{\omega}_D(p+m)T_s)$ is the zero order Bessel function of the first kind calculated at a timely distance of $(p+m)T_s$ from the symbol position of the at least one of the reference symbol positions.

According to an embodiment of the method of FIG. 3, the method further comprises pre-defining a finite set Ω of values of $\hat{\omega}_D$, and minimizing $F_\Delta(\tilde{\omega}_D)$ or $F_r(\tilde{\omega}_D)$ by inserting the values of $\tilde{\omega}_D$ and determining a value of $\hat{\omega}_D$ at which the respective function becomes minimum.

The motivation of the afore-mentioned embodiment is as follows. The optimization problem of equations (8)-(10) is highly non-linear. However, in real applications, one is only interested in an approximation to a certain degree. Therefore, it may turn out to be sufficient to define a limited number of coefficient sets based on 3-10, more particularly 3-5, different values of the Doppler spread. In fact the range of the Doppler spread is thus divided into a limited number of bins according to the accuracy required and the values of $J_0(\,)$ at different lags (symbol position distances from that one of the reference position) will be stored in a look-up-table, thus circumventing the problem of inverting each time the Bessel function. By these measures the solution of the optimization problem boils down to a straight forward comparison with the look-up-table and has thus affordable complexity.

According to an embodiment of the method of FIG. 3, the method further comprises determining whether $\hat{\omega}_D$ is below a predetermined threshold value. According to a further embodiment thereof, the method further comprises so-called reference symbol or pilot averaging, i.e. performing averaging over a predetermined number of channel estimates at pilot symbol positions if $\hat{\omega}_D$ is below the predetermined threshold value.

The aim of the afore-mentioned embodiment is to simplify the channel estimation in case of the detection of a static scenario. If $\hat{\omega}_D < \overline{\omega}_{th}$ (where $\overline{\omega}_{th}$ is the threshold value and is small enough), a first condition is fulfilled to detect a static scenario. Specifically, if a static scenario is determined then also the following relationship is fulfilled:

$$|1-\hat{R}((q+m)T_s)/\hat{R}(pT_s)|<r_{th} \tag{11}$$

where q>p in (10) and $r_{th}$ is small enough and possibly SNR dependent, then the channel can be considered static and one can proceed with reference symbol averaging, in particular pilot averaging. One possible choice for the sample correlations in equation (11) is for example $\hat{R}(2T_s)$ and $\hat{R}(9T_s)$. As a matter of fact, if $\hat{\omega}_D < \overline{\omega}_{th}$ is satisfied we can chose also relatively large values for the lag $(q+m)T_s$ since we are sure that, given the low speed, the corresponding sample correlation will not take negative values.

According to an embodiment of the method of FIG. 3, more elaborate optimization functions than those of equations (8)-(10) can be used to estimate the Doppler spread. One could, for example, consider several pairs of sample functions, optimize them separately and then take the majority vote to estimate $\hat{\omega}_D$.

Figure 4A:
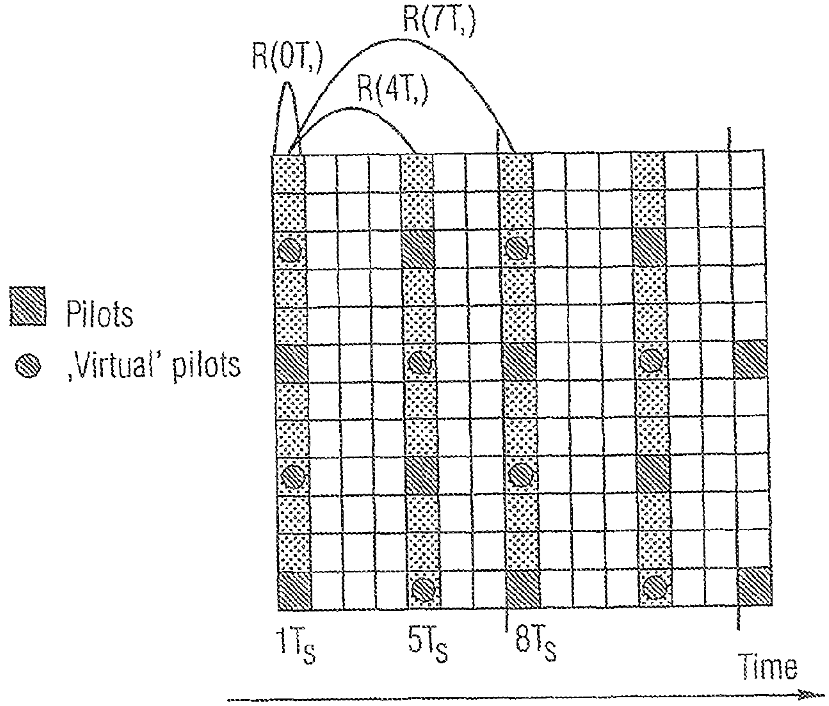
FIGS. 4*a* and 4*b* show symbol-carrier matrices for illustrating a method of Doppler spread estimation according to embodiments.
Figure 4B:
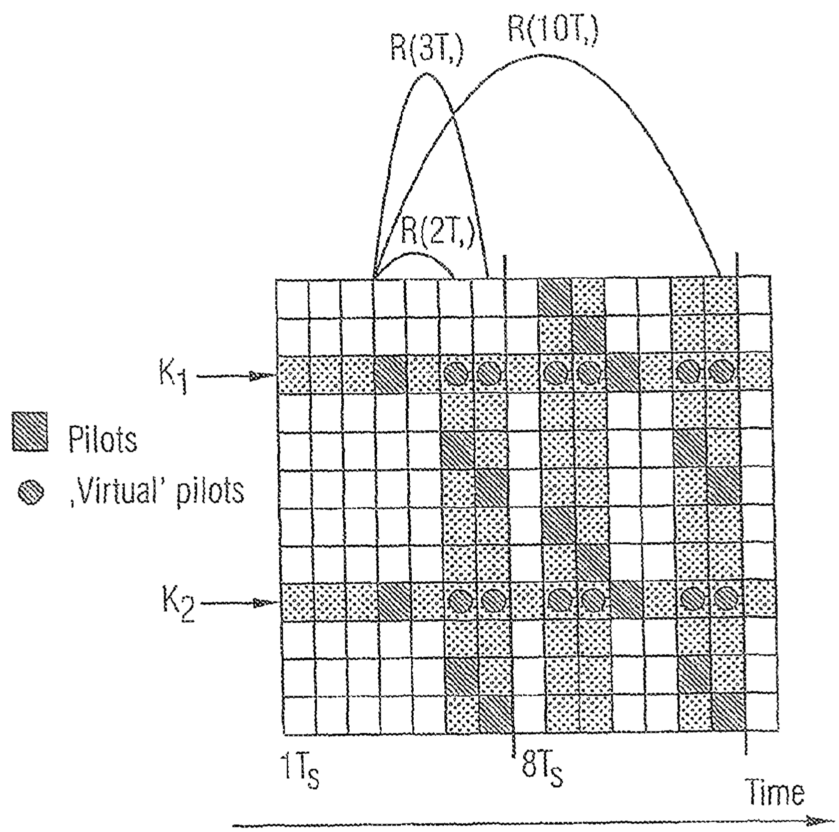

Referring to FIGS. 4*a* and 4*b*, there are shown symbol-carrier matrices to illustrate the process steps of determining channel estimates at reference symbol positions and at "virtual" or "interpolated" symbol positions, and determining auto-correlations or correlations between these determined channel estimates. FIG. 4*a* shows a symbol-carrier matrix containing SCRS symbols (pilots) and "virtual" pilots wherein at the pilot symbol position channel estimates were determined by means of least squares demodulation and at the virtual pilot symbol positions the channel estimates were determined by interpolation from the channel estimates at the pilot symbol positions. There is also shown in symbolized form, how three different correlation values $R(0T_s)$, $R(4T_s)$ and $R(7T_s)$ are determined. In FIG. 4*b* there is shown a symbol-carrier matrix containing positioning reference symbols (PRS (also called pilots here)) and "virtual" pilots comparable with FIG. 4*a*. Also shown in FIG. 4*b* is in symbolized form the determining of three different correlations $R(2T_s)$, $R(3T_s)$, and $R(10T_5)$.

Figure 10:
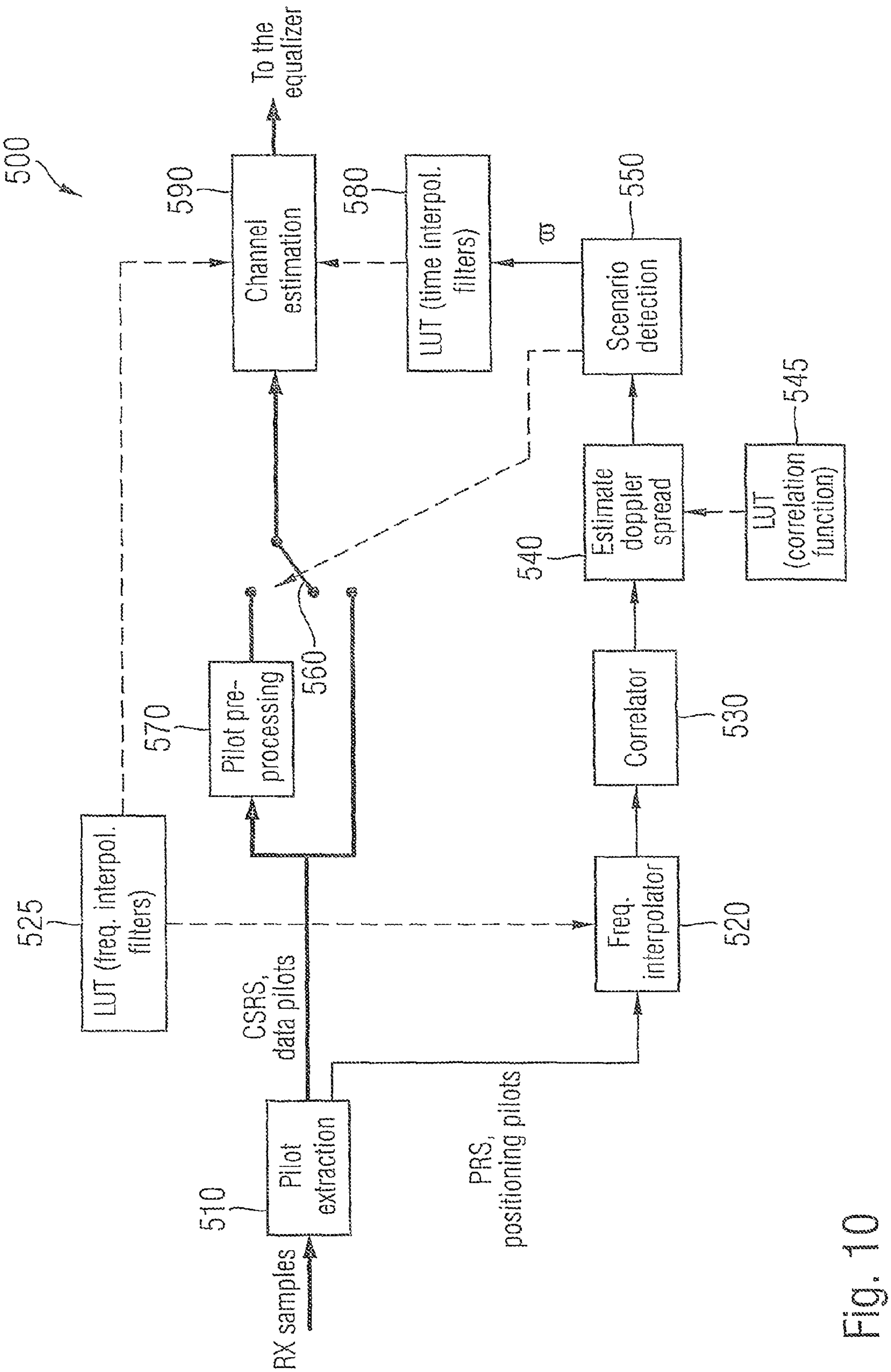
FIG. 10 shows a schematic block representation of a channel estimator for a multiple carrier mobile communication system according to an embodiment.

It is also shown in FIG. 4*b* that the channel estimates and the correlations are determined for two sub-carriers $K_1$ and $K_2$. At sub-carrier $K_1$ and $K_2$ and at times $t_n=nN_s+[6T_s,7T_s,9T_s,10T_s,13T_s,14T_s]$ frequency domain estimates at each subcarrier are obtained using frequency Wiener interpolation filters. At this point the following important additional aspects are to mentioned. Within the embodiment of FIG. 4*b* the pattern of PRS symbols is used for estimating the Doppler spread. It can be seen that the PRS pattern is, in general, better suited for the Doppler spread estimation than the CSRS pattern as the PRS pattern comprises a higher density of pilot symbols. The PRS pattern is transmitted by one specific antenna port of the base station (eNB), namely antenna port 6 according to the LTE standard. The CSRS pattern or patterns are transmitted by other antenna ports of the base station. For example, it was shown in FIG. 2*b* that two antenna ports may transmit two different CSRS patterns that do not interfere with each other. In another embodiment, described in the LTE standard, four antenna ports designated as 0,1,2,3 are utilized to transmit four different CSRS patterns that do not interfere with each other, i.e. have their pilots at respective different symbol positions of the symbol-carrier matrix. These pilots are then used for channel estimation in which filter coefficients are determined to be supplied to a Wiener interpolation filter of the channel estimator for the s 0-3. The filter coefficients for the frequency interpolation can then be used later for the interpolation process to be performed in connection with the PRS pattern. The filter coefficients are thus already available from the channel estimator for ports 0 to 3. This is also shown in FIG. 10 to be described below, in which an LUT 525 stores coefficients for the Wiener frequency interpolator and supplies them to a Channel estimation block 590 as well as to a frequency interpolator 520 which is part of a Doppler spread estimation section (520, 530, 540, 545, 550). Besides that it is also possible to utilize correlations between the antenna ports 0,1,2,3 and 6 for further refining the Doppler spread estimation and the channel estimation process.

Using the least squares estimates at the pilot positions and the frequency interpolated coefficients at the "virtual" pilot positions the following correlations can be obtained:

$$\hat{R}(pT_s) = \frac{1}{2N_pN}\sum_{n=0}^{N-1}\sum_{i=1}^{N_p}\hat{H}_{i,nN_s+m}\hat{H}_{i,nN_s+m+p}m, \tag{12}$$

$$m+p=6,\,7,\,9,\,10,\,13,\,14$$

where $N_p$ is the number of available pilots in the LTE grid, m is a generic OFDM symbol in the sub-frame shown in FIG. 4*b*, and N is the length of the observation interval.

Figure 5:
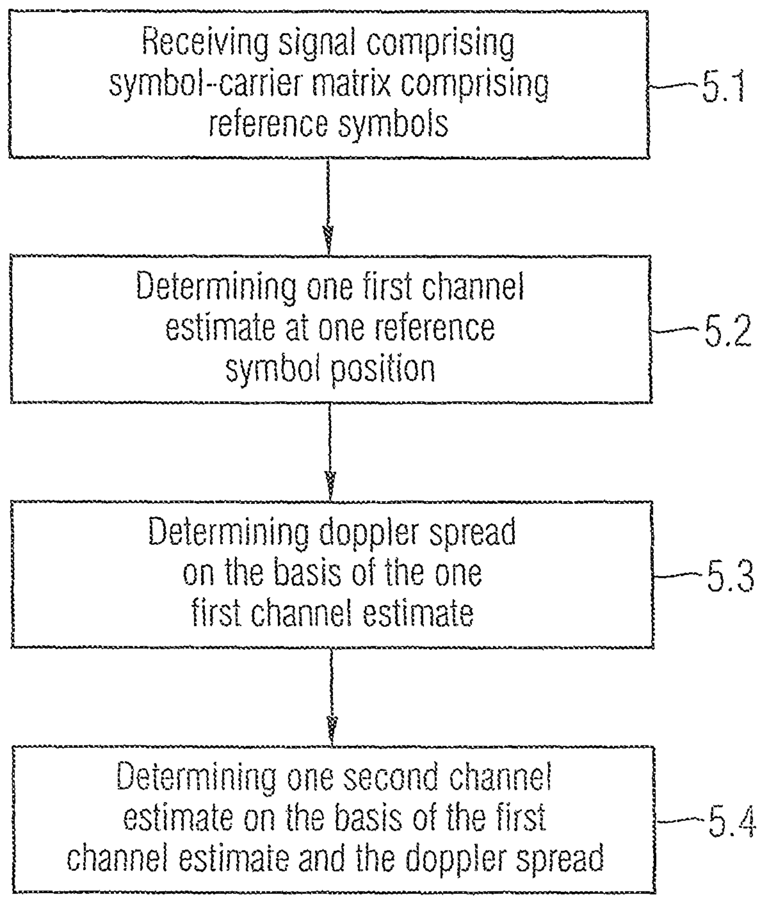
FIG. 5 shows a flow diagram of a method of channel estimation in a multiple carrier mobile communication system according to an embodiment.

Referring to FIG. 5, there is shown a flow diagram for illustrating a method of channel estimation for a multiple carrier mobile communication system. The method comprises receiving a signal comprising a symbol-carrier matrix, the symbol carrier matrix comprising a predetermined pattern of reference symbols at 5.1, and determining first channel estimates at reference symbol positions of the reference symbols in the symbol-carrier matrix at 5.2. The method further comprises determining a Doppler spread on the basis of the determined first channel estimates at 5.3, and determining second channel estimates on the basis of the determined first channel estimates and the determined Doppler spread at 5.4.

According to an embodiment of the method of FIG. 5, the method further comprises determining third channel estimates on the basis of the second channel estimates, in particular from interpolating from the second channel estimates. The second channel estimates can be obtained by frequency interpolation and the third channel estimates can be obtained by time interpolation, or vice versa.

According to an embodiment of the method of FIG. 5, the method further comprises determining the second channel estimates by interpolating from the first channel estimates. According to a further embodiment thereof, the method further comprises supplying the first channel estimates to an interpolation filter, determining interpolation coefficients on the basis of the determined Doppler spread, and supplying the determined interpolation coefficients to the interpolation filter.

According to an embodiment of the method of FIG. 5, the reference symbols comprise positioning reference symbols.

According to an embodiment of the method of FIG. 5, the reference symbols comprise cell-specific reference symbols.

According to an embodiment of the method of FIG. 5, the method further comprises determining whether the determined Doppler spread is below a predetermined threshold value. According to a further embodiment thereof, the method further comprises pilot averaging, i.e. performing averaging over a predetermined number of channel estimates if the determined Doppler spread is below the predetermined threshold value.

Further embodiments of the method of FIG. 5 can be formed along the line of embodiments as were described in connection with the method of FIG. 3.

Figure 6:
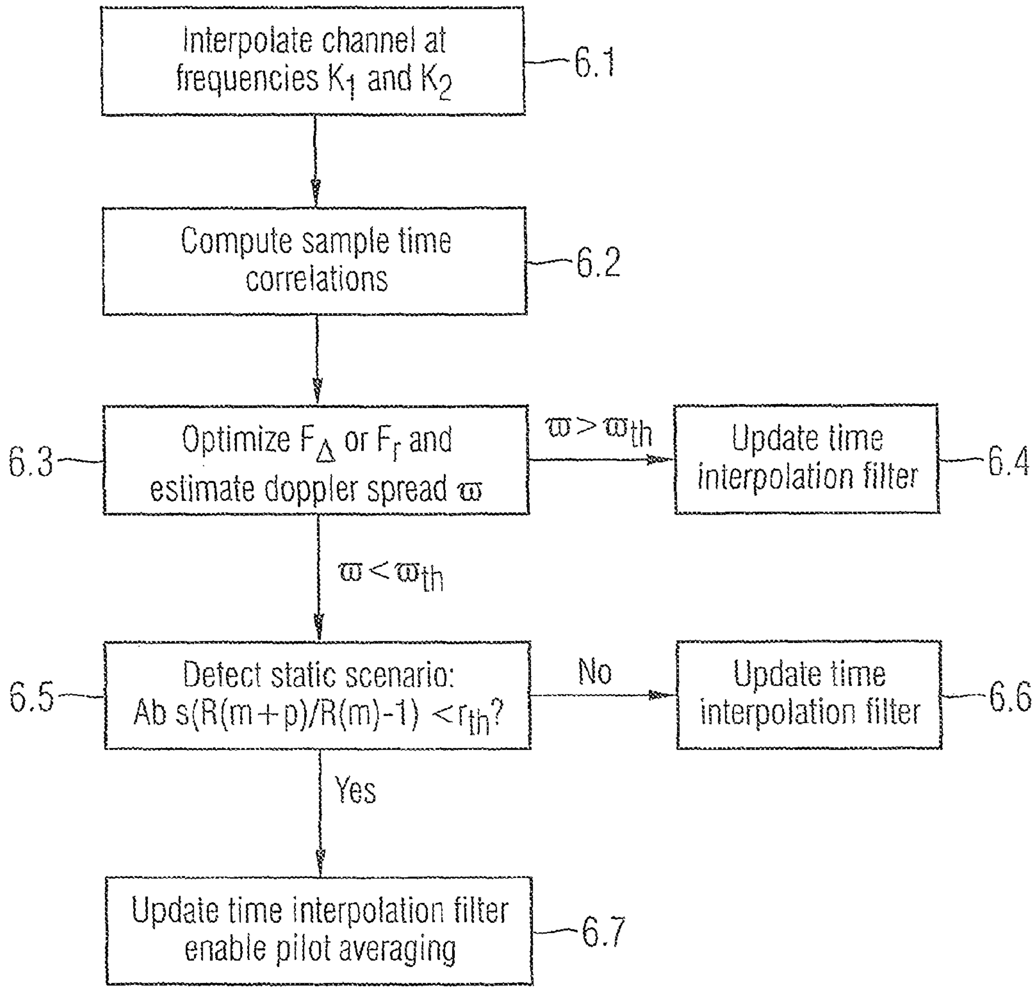
FIG. 6 shows a flow diagram of a method of channel estimation in a multiple carrier mobile communication system according to an embodiment.

Referring to FIG. 6, there is shown a flow diagram for illustrating a method of channel estimation for a multiple carrier mobile communication system according to an embodiment. This embodiment is to be seen in connection with the embodiment of FIG. 3 together with FIG. 4*b*. The method comprises determining channel estimates by least squares estimation and interpolation at frequencies $K_1$ and $K_2$ at 6.1, computing the correlations of the channel estimate samples at 6.2, and optimizing the function $F_\Delta$ or $F_r$ and in this way estimating the Doppler spread $\hat{\omega}_D$ at 6.3. Thereafter it is determined whether the Doppler spread $\hat{\omega}_D$ is below the threshold values $\omega_{th}$. If this is not the case, the flow diagram ends at block 6.4 comprising updating the interpolation filter with the estimated Doppler spread $\hat{\omega}_D$. If If it is the case, then the block 6.5 comprises detecting whether a static scenario is reached, i.e. checking whether the above relationship (11) is fulfilled. If the answer is no, then the flow diagram ends at block 6.6, which is the same as block 6.4. If it is the case, then it has been determined that the static scenario has been reached and the next block 6.7 comprises updating the interpolation filter and enabling pilot averaging.

Figure 7:
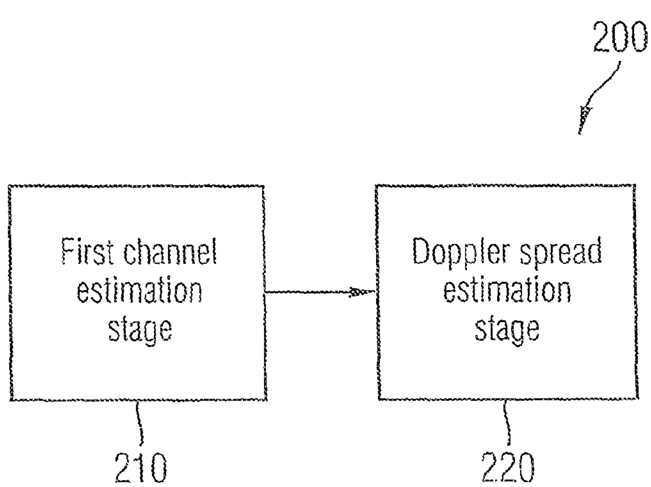
FIG. 7 shows a schematic block representation of a Doppler spread estimator for a multiple carrier mobile communication system according to an embodiment.

Referring to FIG. 7, there is shown a schematic block representation of a Doppler spread estimator for a multiple carrier mobile communication system. The Doppler spread estimator 200 of FIG. 7 comprises a first channel estimation stage 210 configured to determine at least one first channel estimates at at least one of reference symbol positions of reference symbols in a symbol-carrier matrix of a received signal and a Doppler spread estimation stage 220 configured to determine a Doppler spread $\hat{\omega}_D$ on the basis of the at least one determined first channel estimate.

According to an embodiment of the Doppler spread estimator of FIG. 7, the first channel estimation stage 210 is configured to determine the first channel estimate by a least squares demodulation of the reference symbols.

According to an embodiment of the Doppler spread estimator of FIG. 7, the estimator further comprises a second channel estimation stage configured to determine second channel estimates at symbol positions other than the reference symbol positions, in particular by means of interpolation such as Wiener interpolation.

According to an embodiment of the Doppler spread estimator of FIG. 7, the Doppler spread estimation stage is configured to determine an auto-correlation $\hat{R}(0T_s)=\hat{H}_{i,k}\times\hat{H}^*_{i,k}$ of the at least one channel estimate $\hat{H}_{i,k}$ or of a channel estimate at a symbol position other than the reference symbol position, or determining at least one further channel estimate $\hat{H}_{i,k+1}$ and determining a correlation $\hat{R}(lT_s)=\hat{H}^*_{i,k+1}$, wherein I=1, 2, . . . .

According to an embodiment of the Doppler spread estimator of FIG. 7, the Doppler spread estimation stage 220 is configured to determinine the Doppler spread $\hat{\omega}_D$ by minimizing a function of the type $$\hat{\omega}_D = \underset{\tilde{\omega}_D}{\operatorname{argmin}}\left[J_0(\tilde{\omega}_D nT_s) - \hat{R}(nT_s)\right]^2,$$

wherein $\omega_D=2\pi f_D$ where $f_D$ is the Doppler band width, and $J_0(\hat{\omega}_D nT_s)$ is the zero order Bessel function of the first kind calculated at a timely distance of $nT_s$ from the symbol position of the at least one of the reference symbol positions.

According to another embodiment of the Doppler spread estimator of FIG. 7, the Doppler spread estimation stage 220 is configured to determine the Doppler spread $\hat{\omega}_D$ by minimizing a function of the type $$F_\Delta(\tilde{\omega}_D)=[(J_0(\tilde{\omega}_D(p+m)T_s)-J_0(\tilde{\omega}_D pT_s))-(\hat{R}((p+m)T_s)-\hat{R}(pT_s))]^2$$

or of the type $$F_r(\tilde{\omega}_D)=[(J_0(\tilde{\omega}_D(p+m)T_s)/J_0(\tilde{\omega}_D pT_s))-(\hat{R}((p+m)T_s)/\hat{R}(pT_s))]^2$$

wherein $\omega_D=2\pi f_D$ where $f_D$ is the Doppler bandwidth, p=0, 1,2, . . . , m=1,2, . . . , and $J_0(\hat{\omega}_D pT_s)$ is the zero order Bessel function of the first kind calculated at a timely distance of $pT_s$ from the symbol position of the at least one of the reference symbol positions and $J_0(\hat{\omega}_D(p+m)T_s)$ is the zero order Bessel function of the first kind calculated at a timely distance of $(p+m)T_s$ from the symbol position of the at least one of the reference symbol positions.

According to an embodiment of the Doppler spread estimator of FIG. 7, the Doppler spread estimation stage 220 is configured to determine whether the determined Doppler spread is below a predetermined threshold value.

Further embodiments of the Doppler spread estimator of FIG. 7 can be formed along the embodiments as described above in connection with the method of FIG. 3.

Figure 8:
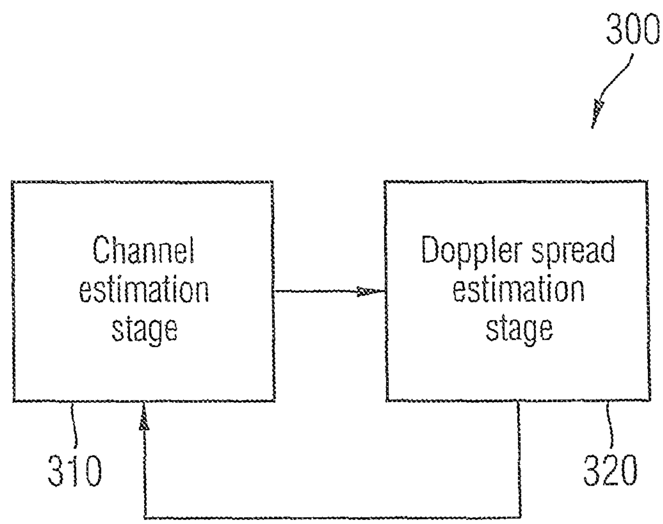
FIG. 8 shows a schematic block representation of a channel estimator for a multiple carrier mobile communication system according to an embodiment.

Referring to FIG. 8, there is shown a schematic block representation of a channel estimator for a multiple carrier mobile communication system. The channel estimator 300 of FIG. 8 comprises a channel estimation stage 310 configured to determine channel estimates, and a Doppler spread estimation stage 320 configured to determine a Doppler spread on the basis of the determined channel estimates, wherein an output of the Doppler spread estimation stage 320 is connected with an input of the channel estimation stage 310.

According to an embodiment of the channel estimator of FIG. 8, the channel estimation stage 310 comprises a least squares estimation section.

According to an embodiment of the channel estimator of FIG. 8, the channel estimation stage comprises an interpolation filter. According to a further embodiment thereof, the Doppler spread estimation stage 320 is configured to determine interpolation coefficients on the basis of the determined Doppler spread and to supply the determined interpolation coefficients to the interpolation filter.

Further embodiments of the channel estimator of FIG. 8 can be formed along the line of the embodiments as described in connection with the method of FIG. 3.

Figure 9:
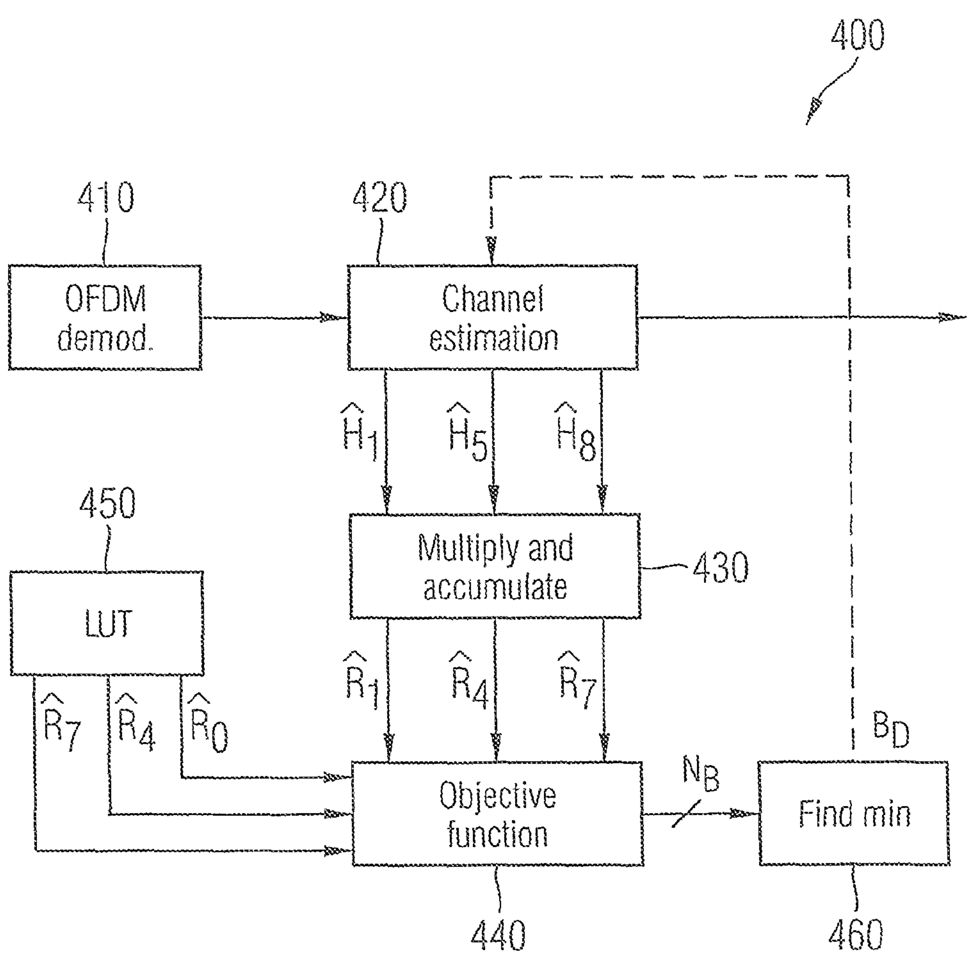
FIG. 9 shows a schematic block representation of a channel estimator for a multiple carrier mobile communication system according to an embodiment.

Referring to FIG. 9, there is shown a schematic block representation of a channel estimator for a multiple carrier mobile communication system according to an embodiment. The embodiment of FIG. 9 is to be understood in connection with the embodiment of FIG. 4*a*. The channel estimator 400 of FIG. 9 comprises an OFDM demodulator 410 which may include the units 20, 30 and 40 as depicted in FIG. 1 and set out above. The OFDM demodulator 410 is connected with a channel estimation unit 420 which may determine the channel estimates $\hat{H}_1$, $\hat{H}_5$ and $\hat{H}_8$ supply them to a multiplication and accumulation unit 430. The multiplication and accumulation unit 430 generates the correlation values $\hat{R}_0$, $\hat{R}_4$ and $\hat{R}_7$ and supplies them to the objective function unit 440. In the objective function unit 440 one or both of the functions as set out in equations (9) and (10) are determined. The objective function unit 440 is connected with an LUT (look-up-table) unit 450 in which the values of the Bessel function designated here as $J_0$, $J_4$ and $J_7$ pre-calculated and the lags $T_0$, $T_4$ and $T_7$ are stored for supplying them to the objective function unit 440. The objective function unit 440 calculates the objective function for a set Ω of different Doppler spreads $\omega_D$ and delivers the result to a minimum finding unit 460 in which the Doppler spread $\omega_D$ is found which yields a minimum value of the objective function. The minimum finding unit 460 supplies the Doppler spread $\omega_D$ to the channel estimation unit 420. At the beginning of the process the channel estimation unit 420 may start with any value of the Doppler spread which is assumed or estimated in some other way.

From the afore-going description, in particular the equations (3), (8)-(10), FIG. 4*a* and FIG. 9, it becomes apparent that in principle also a term $R(0T_s)$ could be calculated and used as part of the optimization function. It should be noted, however, that in many cases $R(0T_s)$ will at least not be used for the optimization function because of its relatively high noise and possible interference. It can be used for normalizing the Bessel function with an estimate of the channel energy. This estimate could be obtained by calculating, the sample correlation at lag 0; however, such an estimate would be biased, since $$E\{|\hat{H}_{i,k}|^2\}=\hat{R}(0T_s)=R(0T_s)+\sigma^2 \tag{13}$$

where $\sigma^2$ accounts for the estimation noise in the frequency estimates $\hat{H}_{i,k}$ . In a typical implementation of a OFDM receiver, estimates of the noise variance are provided by the signal-to-noise ratio estimator. We thus modify the proposed and the conventional algorithm as follows:

$$\hat{\omega}_D^N = \underset{\tilde{\omega}_D}{\operatorname{argmin}}\left[R^{EST}(0T_s)(J_0(\tilde{\omega}_D 7T_s) - J_0(\tilde{\omega}_D 4T_s)) - \left(\hat{R}(7T_s) - \hat{R}(4T_s)\right)\right]^2 \tag{14}$$

$$\hat{\omega}_D^{L,N} = \underset{\tilde{\omega}_D}{\operatorname{argmin}}\left[R^{EST}(0T_s)\left(J_0(\tilde{\omega}_D 7T_s) - \hat{R}(7T_s)\right]^2 \tag{15}$$

where $R^{EST}(0T_s) = \hat{R}(0T_s) - \hat{\sigma}^2$.

Referring to FIG. 10, there is shown a schematic block representation of a channel estimator according to an embodiment. The channel estimator 500 of FIG. 10 is configured to estimate the Doppler spread by utilizing the positioning reference symbols. The estimator 500 comprises a pilot extraction unit 510 at an input of which the RX samples are supplied. A first output of the pilot extraction unit 510 delivers the CSRS pilots and a second output of the pilot extraction unit 510 delivers the PRS pilots. The second output is connected to an input of a frequency interpolator 520 for interpolating the channel estimates at symbol positions other than the pilot symbol positions on the basis of channel estimates at the pilot symbol positions obtained by least square estimation. An input of the frequency interpolator 520 is connected with an LUT unit 525 in which coefficients for the frequency interpolation filters are stored. An output of the frequency interpolator 520 is connected with an input of a correlator 530 in which the correlation values R are calculated. An output of the correlator 530 is connected with an input of a Doppler spread estimation unit 540 in which the Doppler spread is estimated as outlined above. An input of the Doppler spread estimation unit 540 is connected with an LUT 545 in which the pre-calculated values of the Bessel function are stored. An output of the Doppler spread estimation unit 540 is connected with a scenario detection unit 550 in which it is determined whether the estimated Doppler spread is such that a static scenario can be determined. An output of the scenario detection unit 550 is connected with a switch 560 that enables the activation of a pilot pre-processing unit 570 which is connected with an output of the pilot extraction unit 510. The switch 560 is connected with an input of a channel estimation unit 590 an output of which is connected with an equalizer (not shown). An output of the scenario detection unit 550 is connected with an input of an LUT 580 in which the coefficients for the time interpolation filters are stored. If no static scenario is detected in the scenario detection unit 550 then the CSRS pilots are not processed in any way but directly supplied to the channel estimation unit 590. However, if the scenario detection unit 550 detects a static scenario, then the CSRS pilots are supplied to the pilot pre-processing unit 570 in which pilot averaging is performed.

Figure 11:
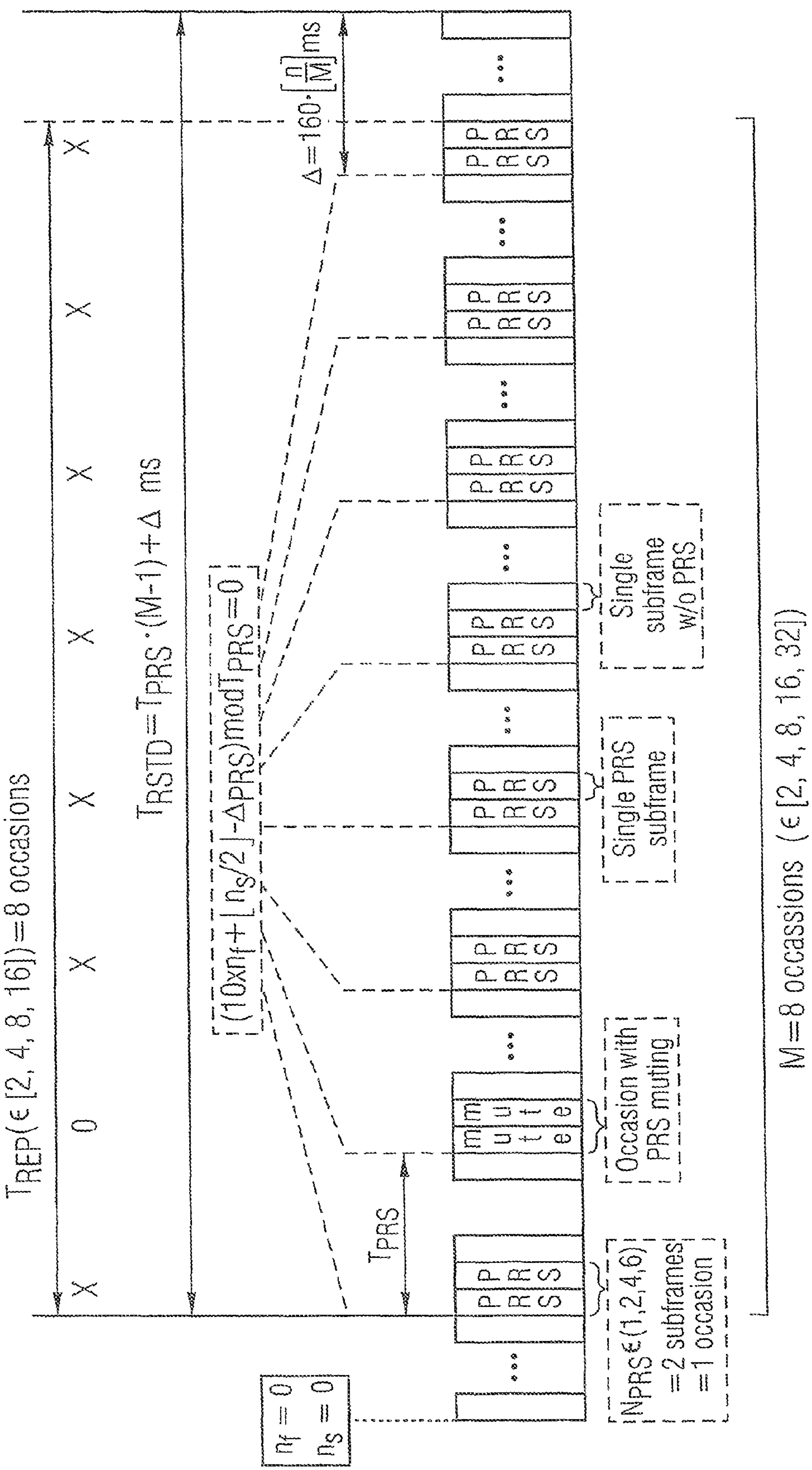
FIG. 11 shows a time diagram for illustrating the scheduling of the transmission of positioning reference symbols.

Referring to FIG. 11, there is shown a time diagram for illustrating the PRS sub-frame scheduling. The multiple PRS configuration parameters are described as follows.

- $N_{PRS}$ is the number of consecutive downlink sub-frames, which defines 1 PRS occasion, and is limited to 1,2,4,6.
- $I_{PRS}$ is the positioning reference signals configuration index (not visible in FIG. 11), which defines the sub-frame configuration period $T_{PRS}$ (160 to 1280 ms) and the sub-frame offset $\Delta_{PRS}$ (0 to 2975 ms).
- The parameter n is the number of cells, which simultaneously send their PRS and have to be detected by the UE.
- M is the number of PRS occasions (limited to 2, 4, 8, 16, 32), each containing $N_{PRS}$ consecutive sub-frames.
- $T_{RSTD}$ determines an overall duration provided for the RSTD measurement, including the grace period of Δ (multiples of 160 ms) for the processing delay after the beginning of the last PRS occasion in a $T_{RSTD}$ interval,
- $T_{REP}$ is counted in PRS occasions and limited to 2, 4, 8, 16, which equals the length of the masking bit vector: if the bit is false (0), the respective PRS occasion is muted.

PRS-Muting prevents interference of neighbor cells with identical CellID, which transmit the PRS on the same RE.

The time diagram in FIG. 11 shows the potential PRS resources and possible update rates available for the Doppler estimation. One PRS occasion comprises up to 6 PRS-carrying sub-frames, which contains as twice as many resource elements as the CSRS-carrying sub-frames and, therefore, results in a highly accurate (snapshot) Doppler estimate. The update time could vary between 160 ms up to 1.28 s. In practice, 1 s is still a reasonable update time to resolve changes of the Doppler speed. Since Doppler and Positioning update are closely related, one can expect that the configuring mobile location center decides for a tradeoff between snapshot accuracy ($N_{PRS}$) and the update accuracy ($T_{PRS}$).

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method of Doppler spread estimation in a multiple carrier mobile communication system, comprising:

receiving a signal comprising a symbol-carrier matrix, the symbol-carrier matrix comprising a predetermined pattern of reference symbols;

determining at least one channel estimate $\hat{H}_{i,k}$ at at least one of the reference symbol positions of the reference symbols in the symbol-carrier matrix, wherein i =0,1,2, . . . is the carrier index and k =0,1,2, . . . is the symbol index of the symbol-carrier matrix;

determining an auto-correlation of the at least one channel estimate $\hat{H}_{i,k}$; and determining a Doppler spread $\hat{\omega}_D$ on the basis of the at least one determined channel estimate $\hat{H}_{i,k}$ by minimizing a distance between a zero-order Bessel function of the first kind calculated at a distance of n symbol periods $T_s$ from the symbol position of the at least one of the reference symbol positions and the autocorrelation of the at least one channel estimate at the distance of n symbol periods $T_s$ wherein [n=0,1,2, . . . ].

2. The method according to claim 1, wherein the reference symbols comprise positioning reference symbols.

3. The method according to claim 1, wherein the reference symbols comprise cell specific reference symbols.

4. The method according to claim 1, further comprising: determining whether $\hat{\omega}_d$ is below a predetermined threshold value.

5. The method according to claim 4, further comprising: performing averaging over a predetermined number of channel estimates if $\hat{\omega}_D$ is below the predetermined threshold value.

6. A method of Doppler spread estimation in a multiple carrier mobile communication system, comprising:

receiving a signal comprising a symbol-carrier matrix, the symbol-carrier matrix comprising a predetermined pattern of reference symbols;

determining at least one channel estimate $\hat{H}_{i,k}$ at at least one of the reference symbol positions of the reference symbols in the symbol-carrier matrix, wherein i=0,1,2, . . . is the carrier index and k=0,1,2, . . . is the symbol index of the symbol-carrier matrix; and determining a Doppler spread $\hat{\omega}_D$ on the basis of the at least one determined channel estimate $\hat{H}_{i,k}$ by minimizing a function of the type $$F_\Delta(\tilde{\omega}_D)=[(J_0(\tilde{\omega}_D(p+m)T_s)-J_0(\tilde{\omega}_D pT_s))-(\hat{R}((p+m)T_s)-\hat{R}(pT_s))]^2$$

or of the type $$F_\Delta(\tilde{\omega}_D)=[(J_0(\tilde{\omega}_D(p+m)T_s)/J_0(\tilde{\omega}_D pT_s))-(\hat{R}((p+m)T_s)/\hat{R}(pT_s))]^2$$

wherein $\omega_D=2\pi f_D$ where $f_D$ is the Doppler bandwidth, p=0, 1,2, . . . , m=1,2, . . . , and$J_0(\hat{\omega}_D pT_s)$ is the zero order Bessel function of the first kind calculated at a distance of $pT_s$ from the symbol position of the at least one of the reference symbol positions and $J_0(\hat{\omega}_D(p+m)T_s)$ is the zero order Bessel function of the first kind calculated at a distance of $(p+m)T_s$ from the symbol position of the at least one of the reference symbol positions.

7. The method according to claim 6, further comprising:

pre-defining a finite set Ωof values of $\tilde{\omega}$, and minimizing $F_\Delta(\tilde{\omega}_D)$ or $F_r(\tilde{\omega}_D)$ by inserting the values of $\hat{\omega}_D$ and determining a value of $\hat{\omega}_D$ at which the respective function becomes minimum.

8. A method of channel estimation in a multiple carrier mobile communication system, comprising:

receiving a signal comprising a symbol-carrier matrix, the symbol-carrier matrix comprising a predetermined pattern of reference symbols;

determining at least one first channel estimate at at least one reference symbol position of the reference symbols in the symbol-carrier matrix;

determining a Doppler spread on the basis of the at least one determined first channel estimate; and determining at least one second channel estimate on the basis of the at least one determined first channel estimate and the determined Doppler spread by interpolating from the first channel estimates, wherein determining the second channel estimates by interpolating the first channel estimate further comprises:

supplying the first channel estimates to an interpolation filter, determining interpolation coefficients on the basis of the determined Doppler spread, supplying the determined interpolation coefficients to the interpolation filter, and generating the second channel estimates at the output of the interpolation filter using the supplied first channel estimates and the determined interpolation coefficients.

9. The method according to claim 6, wherein the reference symbols comprise positioning reference symbols.

10. The method according to claim 6, wherein the reference symbols comprise cell specific reference symbols.

11. The method according to claim 6, further comprising: determining whether the determined Doppler spread is below a predetermined threshold value.

12. The method according to claim 11, further comprising: performing averaging over a predetermined number of channel estimates if the determined Doppler spread is below the predetermined threshold value.

13. A Doppler spread estimator for a multiple carrier mobile communication system, comprising:

a first channel estimation stage configured to determine at least one first channel estimate at at least one reference symbol position of reference symbols in a symbol-carrier matrix of a received signal; and a Doppler spread estimation stage configured to determine a Doppler spread $\hat{\omega}_D$ on the basis of the at least one determined first channel estimate, wherein the Doppler spread estimation stage is configured to determine an autocorrelation of the at least one first channel estimate and to determine the Doppler spread $\hat{\omega}_D$ by minimizing a distance between a zero-order Bessel function of the first kind calculated at a distance of n symbol periods $T_s$ from a symbol position of the at least one reference symbol position and the autocorrelation of the at least one first channel estimate at the distance of n symbol periods $T_s$ wherein n=[0,1,2, . . . ].

14. The Doppler spread estimator according to claim 13, wherein the Doppler spread estimation stage is configured to determine whether the determined Doppler spread is below a predetermined threshold value.

15. A Doppler spread estimator for a multiple carrier mobile communication system, comprising:

a first channel estimation stage configured to determine at least one first channel estimate at at least one reference symbol position of reference symbols in a symbol-carrier matrix of a received signal; and a Doppler spread estimation stage configured to determine a Doppler spread $\hat{\omega}_D$ on the basis of the at least one determined first channel estimate, wherein the Doppler spread estimation stage is configured to determine an auto-correlation $\hat{R}(0T_s)=\hat{H}_{i,k}\times\hat{H}_{i,k}^*$ of the at least one channel estimate $\hat{H}_{i,k}$ or of a channel estimate at a symbol position other than the reference symbol position, or determine at least one further channel estimate $\hat{H}_{i,k+l}$ and determine a correlation $\hat{R}(lT_s)=\hat{H}_{i,k}\times\hat{H}_{i,k+l}^*$, wherein l =1,2, . . . , and wherein the Doppler spread estimation stage is configured to determine the Doppler spread $th_D$ by minimizing a function of the type $$F_\Delta(\tilde{\omega}_D)=[(J_0(\tilde{\omega}_D(p+m)T_s)-J_0(\tilde{\omega}_D pT_s))-(\hat{R}((p+m)T_s)-\hat{R}(pT_s))]^2$$

or of the type $$F_r(\tilde{\omega}_D)=[(J_0(\tilde{\omega}_D(p+m)T_s)/J_0(\tilde{\omega}_D pT_s))-(\hat{R}((p+m)T_s)/\hat{R}(pT_s))]^2$$

wherein $\omega_D=2\pi f_D$ where $f_D$ is the Doppler bandwidth, p=0, 1,2, . . . , m=1,2, . . . , and $J_0(\hat{\omega}_D pT_s)$ is the zero order Bessel function of the first kind calculated at a distance of $pT_s$ from the symbol position of the at least one of the reference symbol positions and $J_0(\hat{\omega}_D(p+m)T_s)$ is the zero order Bessel function of the first kind calculated at a distance of $(p+m)T_s$ from the symbol position of the at least one of the reference symbol positions.

16. A channel estimator for a multiple carrier mobile communication system, comprising:

a channel estimation stage configured to determine channel estimates, wherein the channel estimation stage comprises an interpolation filter, and a Doppler spread estimation stage configured to determine a Doppler spread on the basis of the determined channel estimates, wherein an output of the Doppler spread estimation stage is connected with an input of the channel estimation stage, wherein the Doppler spread estimation stage is configured to determine interpolation coefficients on the basis of the determined Doppler spread and to supply the determined interpolation coefficients to the interpolation filter.

17. The channel estimator according to claim 16, wherein the channel estimation stage comprises a least squares estimation section.

* * * * *

UNITED STATES PATENT AND TRADEMARK OFFICE

CERTIFICATE OF CORRECTION

PATENT NO. : 8,675,792 B2
APPLICATION NO. : 13/226580
DATED : March 18, 2014
INVENTOR(S) : Cecilia Carbonelli et al.

It is certified that error appears in the above-identified patent and that said Letters Patent is hereby corrected as shown below:

In the Claims

Column 13, Claim 6, Line 61 Please replace “estimate $\hat{H}_{i,k}$ at”

With --estimate $\hat{H}_{i,k}$ at--

Column 14, Claim 6, Line 7 Please replace

“ $F_{\Delta}(\tilde{\omega}_D) = \left[\left(J_0(\tilde{\omega}_D(p+m)T_s)/J_0(\tilde{\omega}_D pT_s)\right) - \left(\hat{R}((p+m)T_s)/\hat{R}(pT_s)\right)\right]^2$ ”

With -- $F_r(\tilde{\omega}_D) = \left[\left(J_0(\tilde{\omega}_D(p+m)T_s) / J_0(\tilde{\omega}_D pT_s)\right) - \left(\hat{R}((p+m)T_s) / \hat{R}(pT_s)\right)\right]^2$ --

Column 14, Claim 7, Line 19 Please replace “set Ωof values of w, and”

With --set Ω of values of $\tilde{\omega}_D$, and--

Column 15, Claim 15, line 31 Please replace “ $\hat{R}(0T_s) = \hat{H}_{l,k} \times \hat{H}_{i,k}*$ ”

With -- $\hat{R}(0T_s) = \hat{H}_{i,k} \times \hat{H}^*_{i,k}$ --

Signed and Sealed this
Twenty-seventh Day of May, 2014

Michelle K. Lee
*Deputy Director of the United States Patent and Trademark Office*

Column 15, Claim 15, line 37 Please replace " $\hat{R}(lT_s) = \hat{H}_{l,k} \times \hat{H}_{l,k+l}$ * "

With -- $\hat{R}(lT_s) = \hat{H}_{i,k} \times \hat{H}^{*}_{i,k+1}$ --

Column 16, Claim 15, line 2 Please replace "$th_D$"

With -- $\hat{\omega}_D$ --

Column 16, Claim 15, line 11 Please replace "and $J_0(\hat{\omega}_D p T_s)$ is the zero order"

With --and $J_0(\hat{\omega}_D p T_s)$ is the zero order--